US008108233B2

(12) United States Patent
Ernest et al.

(10) Patent No.: US 8,108,233 B2
(45) Date of Patent: Jan. 31, 2012

(54) METHOD, SYSTEM, AND PROGRAM PRODUCT FOR GENERATING AN INTEGRATED BUSINESS ORGANIZATIONAL VIEW

(75) Inventors: Leslie M. Ernest, Knoxville, MD (US); Rick A. Hamilton, II, Charlottesville, VA (US); Ronnie L. Huskey, Haslet, TX (US); Albert L. Swett, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 11/408,907

(22) Filed: Apr. 21, 2006

(65) Prior Publication Data

US 2007/0250373 A1 Oct. 25, 2007

(51) Int. Cl.
*G06Q 10/00* (2006.01)
(52) U.S. Cl. ......... 705/7.11; 705/12; 705/7.13; 705/348
(58) Field of Classification Search .............. 705/10, 705/7, 7.11, 7.13, 12, 348
See application file for complete search history.

(56) References Cited

U.S. PATENT DOCUMENTS

| | | | | |
|---|---|---|---|---|
| 2001/0027455 A1* | 10/2001 | Abulleil et al. | .......... | 707/102 |
| 2002/0169658 A1* | 11/2002 | Adler | .......... | 705/10 |
| 2003/0208429 A1* | 11/2003 | Bennett | .......... | 705/36 |
| 2004/0143470 A1* | 7/2004 | Myrick et al. | .......... | 705/7 |
| 2005/0203784 A1* | 9/2005 | Rackham | .......... | 705/7 |
| 2005/0222929 A1 | 10/2005 | Steier et al. | | |
| 2005/0246215 A1* | 11/2005 | Rackham | .......... | 705/7 |
| 2006/0224984 A1* | 10/2006 | Albrecht et al. | .......... | 715/764 |

OTHER PUBLICATIONS

L Cherbakov, G Galambos, R Harishankar, S Kalyana, & G Rackham. (2005). Impact of service orientation at the business level. IBM Systems Journal, 44(4), 653-668.*
IBM to Help Automotive Industry Address Warranty Pain Through New Business Initiatives. (Oct. 18, 2004). Business Wire, p. 1.*

* cited by examiner

*Primary Examiner* — Lynda Jasmin
*Assistant Examiner* — Timothy Padot
(74) *Attorney, Agent, or Firm* — William Scheisser Hoffman Warnick LLC (57) ABSTRACT

Under the present invention, components pertaining to a particular business operation of an organization are identified arranged into a component map. Information corresponding to a set of financial and staffing variables for the components is then gathered. During a workshop or the like, votes regarding a differentiation factor and an effectiveness factor of each of the components are received according to a predetermined scale. When vote quality is deemed acceptable (e.g., according to a standard deviation), a series of individual heat maps will be generated from the component map using the votes and the information previously collected. In general, an individual heat map is generated for each of the differentiation factor, the effectiveness factor, and the set of financial and staffing. Thereafter, an integrated heat map can be generated by combining at least two of the individual heat maps. Finally, an integrated view that contains the integrated heat map and radar views of the individual heat maps will be generated.

30 Claims, 11 Drawing Sheets

| | | Plan and Manage | | | | 2Q Build | | Run | | |
|---|---|---|---|---|---|---|---|---|---|---|
| | IT Customer Relationship Management | IT Business Management | Business Resilience | Information and Knowledge Management | | Service and Solution Development | Service and Solution Deployment | Service Delivery and Support | | |
| Direct / Strategy | C111 - Business Enablement Service & Solution Strategy | C211 - Business Technology Strategy | C311 - Business Resilience Strategy | C411 - Information Management Strategy | | C511 - Development Strategy | C611 - Deployment Strategy | C711 - Services Delivery Strategy | | |
| | | C212 - Enterprise Architecture | C312 - Regulatory Compliance Strategy | C412 - Knowledge Management Strategy | | | | C712 - IT Support Strategy | | |
| | | C213 - Portfolio Management | C313 - Integrated Risk Strategy | | | | | | | |
| | | C214 - Technology Innovation | | | | | | | | |
| Control / Tactics | C121 - Business Performance Planning | C221 - Financial Management | C321 - Continuous Business Operations | C421 - Information Architecture | | C521 - Services and Solutions Lifecycle | C621 - Change Planning | C721 - Operations Planning | | |
| | C122 - Demand Management | C222 - Business Technology Performance & Value | C322 - Regulatory Compliance | C422 - Information Resource Management | | C522 - Services and Solutions Architecture | C622 - Release Planning | C722 - Infrastructure Resource Planning | | |
| | C123 - Communications Planning | C223 - Human Resources Management | C323 - Integrated Risk Management | C423 - Knowledge Resource Management | | | | C723 - Support Services Planning | | |
| | | | C324 - Security, Privacy and Data Protection | | | | | | | |
| Execute / Operations | C131 - Business Performance Management | C231 - IT Financial Management | C331 - Business Resilience | C431 - Data and Content Management | | C531 - Service and Solution Creation | C631 - Change Implementation | C731 - Support Services Management | | |
| | C132 - IT Service & Solution Marketing | C232 - Staff Administration & Development | C332 - Regulatory Compliance Remediation | C432 - Knowledge Capture and Availability | | C532 - Service and Solution Maintenance | C632 - Release Implementation | C732 - Infrastructure Resource Management | | |
| | | C233 - Supplier and Contract Administration | | | | | | C733 - Infrastructure Operations | | |

| | IT Customer Relationship Management | IT Business Management | Business Resilience 22A | Information and Knowledge Management | Service and Solution Development | Service and Solution Deployment | Service Delivery and Support |
|---|---|---|---|---|---|---|---|
| Direct | C111 - Business Enablement Service & Solution Strategy (1) | C211 - Business Technology Strategy (2) | C311 - Business Resilience Strategy (20) | C411 - Information Management Strategy (26) | C511 - Development Strategy (35) | C611 - Deployment Strategy (44) | C711 - Services Delivery Strategy (20) |
| | | C212 - Enterprise Architecture (12) | C312 - Regulatory Compliance Strategy (12) | C412 - Knowledge Management Strategy (39) | | | C712 - IT Support Strategy (44) |
| | | C213 - Portfolio Management (7) | C313 - Integrated Risk Strategy (5) | | | | |
| | | C214 - Technology Innovation (7) | | | | | |
| Control | C121 - Business Performance Planning (20) | C221 - Financial Management (3) | C321 - Continuous Business Operations (5) | C421 - Information Architecture (32) | C521 - Services and Solutions Lifecycle (32) | C621 - Change Planning (39) | C721 - Operations Planning (15) |
| | C122 - Demand Management (20) | C222 - Business Technology Performance & Value (11) | C322 - Regulatory Compliance (15) | C422 - Information Resource Management (39) | C522 - Services and Solutions Architecture (26) | C622 - Release Planning (47) | C722 - Infrastructure Resource Planning (32) |
| | C123 - Communications Planning (26) | C223 - Human Resources Management (9) | C323 - Integrated Risk Management (4) | C423 - Knowledge Resource Management (25) | | | C723 - Support Services Planning (35) |
| | | | C324 - Security, Privacy and Data Protection (15) | | | | |
| Execute | C131 - Business Performance Management (15) | C231 - IT Financial Management (12) | C331 - Business Resilience (15) | C431 - Data and Content Management (35) | C531 - Service and Solution Creation (30) | C631 - Change Implementation (42) | C731 - Support Services Management (39) |
| | C132 - IT Service & Solution Marketing (26) | C232 - Staff Administration & Development (44) | C332 - Regulatory Compliance Remediation (39) | C432 - Knowledge Capture and Availability (26) | C532 - Service and Solution Maintenance (20) | C632 - Release Implementation (47) | C732 - Infrastructure Resource Management (39) |
| | | C233 - Supplier and Contract Administration (26) | | | | | C733 - Infrastructure Operations (50) |

26

Show Components with Highest and Lowest FTE Levels

| | IT Customer Relationship Management | IT Business Management | Business Resilience | Information and Knowledge Management | Service and Solution Development | Service and Solution Deployment | Service Delivery and Support |
|---|---|---|---|---|---|---|---|
| Direct | C111 - Business Enablement Service & Solution Strategy (13/2.93) | C211 - Business Technology Strategy (43/1.00)<br>C212 - Enterprise Architecture (32/1.39)<br>C213 - Portfolio Management (22/1.87)<br>C214 - Technology Innovation (25/1.68) | C311 - Business Resilience Strategy 20/1.34<br>C312 - Regulatory Compliance Strategy (34/1.35)<br>C313 - Integrated Risk Strategy (37/1.26) | C411 - Information Management Strategy (27/1.53)<br>C412 - Knowledge Management Strategy (31/1.40) | C511 - Development Strategy (5/7.57) | C611 - Deployment Strategy (12/3.10) | C711 - Services Delivery Strategy (19/1.96)<br>C712 - IT Support Strategy (26/1.66) |
| Control | C121 - Business Performance Planning (40/1.19)<br>C122 - Demand Management (44/0.99)<br>C123 - Communications Planning (41/1.17) | C221 - Financial Management (35/1.30)<br>C222 - Business Technology Performance & Value (21/1.88)<br>C223 - Human Resources Management (38/1.25) | C321 - Continuous Business Operations (14/2.69)<br>C322 - Regulatory Compliance (39/1.22)<br>C323 - Integrated Risk Management (42/1.04)<br>C324 - Security, Privacy and Data Protection (24/1.75) | C421 - Information Architecture (36/1.28)<br>C422 - Information Resource Management (29/1.48)<br>C423 - Knowledge Resource Management (33/1.37) | C521 - Services and Solutions Lifecycle (6/7.50)<br>C522 - Services and Solutions Architecture (26) | C621 - Change Planning (8/5.76)<br>C622 - Release Planning (17/2.57) | C721 - Operations Planning (15)<br>C722 - Infrastructure Resource Planning (9/4.83)<br>C723 - Support Services Planning (15/2.65) |
| Execute | C131 - Business Performance Management (45/0.88)<br>C132 - IT Service & Solution Marketing (49/0.47) | C231 - IT Financial Management (50/0.42)<br>C232 - Staff Administration & Development (47/0.65)<br>C233 - Supplier and Contract Administration (48/0.59) | C331 - Business Resilience (18/2.03)<br>C332 - Regulatory Compliance Remediation (30/1.41) | C431 - Data and Content Management (23/1.82)<br>C432 - Knowledge Capture and Availability (46/0.73) | C531 - Service and Solution Creation (10/4.67)<br>C532 - Service and Solution Maintenance (16/2.51) | C631 - Change Implementation (7/6.99)<br>C632 - Release Implementation (20/1.58) | C731 - Support Services Management (3/30.8)<br>C732 - Infrastructure Resource Management (2/33.1)<br>C733 - Infrastructure Operations (1/42.9) |

Lowest FTE 10.0  
Highest FTE 10.0

METHOD, SYSTEM, AND PROGRAM PRODUCT FOR GENERATING AN INTEGRATED BUSINESS ORGANIZATIONAL VIEW

FIELD OF THE INVENTION

The present invention generally relates to a method, system, and program product for generating an integrated view. Specifically, the present invention provides way to integrate and display multiple types of quantitative and opinion data into a view that can be rapidly comprehended and utilized.

BACKGROUND OF THE INVENTION

In general, humans cannot easily cope with multivariate problems (i.e., decisions that have multiple potential solutions). One current approach to facilitate decision-making is to hold workshops where different solutions can be discussed and explained in a group/collaborative environment. In most cases, a considerable amount of information (e.g., data and opinions) is gathered in advance of and/or during the workshop. Navigating through this information and presenting it in a format that can be easily parsed and understood by workshop attendees continues to be a problem. Currently, this problem is addressed through the use of static charts and presentations that have been previously prepared from the source data. Occasionally, dynamic simple bar charts or graphs are used to supplement static charts. In the field of mathematics, there are specialized computational techniques for addressing data integration and display issues, but these methods typically require significant expertise to execute and are not easily customized.

Unfortunately, the current approaches have several drawbacks such as: (1) a lack of responsiveness to opinion data gathered during the work session itself; (2) no dynamic change capability to consider alternatives; (3) bar charts or graphs generally are limited to two or three dimensions and do not support the need to consider a larger number of variables simultaneously; (4) complex mathematical models exist to do, for example, optimization, but they don't easily incorporate opinion and other forms of qualitative data necessary for consensus-building and executive decision-making.

In view of the foregoing, a need exists for a solution that solves at least one of the deficiencies of the related at.

SUMMARY OF THE INVENTION

In general, the present invention provides a method, system, and program product for generating an integrated view. Specifically, under the present invention, components pertaining to a particular business operation (e.g., an IT operation) of an organization are identified and then arranged into a component map by an assessment advisor tool. Information corresponding to a set of financial and staffing variables for the components is gathered and also fed into the tool. During a workshop or the like, votes regarding a differentiation/importance factor and an effectiveness factor of each of the components are received according to a predetermined scale (e.g., 1 to 5) and fed into the tool. A vote quality that is based on a standard deviation of the votes will also be determined. If the vote quality is low, the votes can be discussed during the workshop, and new votes can be taken. Once vote quality is acceptable, a series of individual heat maps that rank the components will be generated from the component map using the votes and the information previously collected. In general, an individual heat map is generated for each of the differentiation/importance factor, the effectiveness factor, and the set of financial and staffing variables. Thereafter, an integrated heat map can be generated to answer a particular query by combining at least two of the individual heat maps. Finally, an integrated view that contains the integrated heat map and radar views of the individual heat maps will be generated.

A first aspect of the present invention provides a method for generating an integrated view, comprising: arranging components of a business operation into a component map; receiving information corresponding to a set of financial and staffing variables for the components; receiving votes regarding a differentiation factor and an effectiveness factor of each of the components according to a predetermined scale; generating, from the component map, individual heat maps for each of the differentiation factor, the effectiveness factor, and the set of financial and staffing using the votes and the information; generating an integrated heat map by combining at least two of the individual heat maps to answer a particular query; and generating the integrated view containing the integrated heat map and radar views of the individual heat maps.

A second aspect of the present invention provides a system for generating an integrated view, comprising: a system for arranging components of a business operation into a component map; a system for receiving information corresponding to a set of financial and staffing variables for the components; a system for receiving votes regarding a differentiation factor and an effectiveness factor of each of the components according to a predetermined scale; a system for generating, from the component map, individual heat maps for each of the differentiation factor, the effectiveness factor, and the set of financial and staffing using the votes and the information; a system for generating an integrated heat map by combining at least two of the individual heat maps to answer a particular query; and a system for generating the integrated view containing the integrated heat map and radar views of the individual heat maps.

A third aspect of the present invention provides a program product stored on a computer readable medium for generating an integrated view, the computer readable medium comprising program code for causing a computer system to perform the following steps: arranging components of a business operation into a component map; receiving information corresponding to a set of financial and staffing variables for the components; receiving votes regarding a differentiation factor and an effectiveness factor of each of the components according to a predetermined scale; generating, from the component map, individual heat maps for each of the differentiation factor, the effectiveness factor, and the set of financial and staffing using the votes and the information; generating an integrated heat map by combining at least two of the individual heat maps to answer a particular query; and generating the integrated view containing the integrated heat map and radar views of the individual heat maps.

A fourth aspect of the present invention provides a method for deploying an application for generating an integrated view, comprising: providing a computer infrastructure being operable to: arrange components of a business operation into a component map; receive information corresponding to a set of financial and staffing variables for the components; receive votes regarding a differentiation factor and an effectiveness factor of each of the components according to a predetermined scale; generate, from the component map, individual heat maps for each of the differentiation factor, the effectiveness factor, and the set of financial and staffing using the votes and the information; generate an integrated heat map by combining at least two of the individual heat maps to answer a particular query; and generate the integrated view containing the integrated heat map and radar views of the individual heat maps.

A fifth aspect of the present invention provides an integrated view, comprising: an integrated heat map generated by combining at least two of a plurality of individual heat maps, wherein each of the plurality of individual heat maps contains components of a business operation that are ranked, and wherein the components are highlighted in the integrated heat map based upon which of the components best answer a query for the business operation; and a plurality of radar views adjacent to the integrated heat map, wherein the plurality of radar views are smaller scale representations of the plurality of individual heat maps.

A sixth aspect of the present invention provides a computer software embodied in a propagated signal for generating an integrated view, the computer software comprising instructions for causing a computer system to perform the following steps: arranging components of a business operation into a component map; receiving information corresponding to a set of financial and staffing variables for the components; receiving votes regarding a differentiation factor and an effectiveness factor of each of the components according to a predetermined scale; generating, from the component map, individual heat maps for each of the differentiation factor, the effectiveness factor, and the set of financial and staffing using the votes and the information; generating an integrated heat map by combining at least two of the individual heat maps to answer a particular query; and generating the integrated view containing the integrated heat map and radar views of the individual heat maps.

A seventh aspect of the present invention provides a business method for generating an integrated view.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 2 shows a component map according to the present invention.

FIGS. 5A-B show illustrative heat maps generated according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

For convenience, the Best Mode for Carrying Out the Invention has the following sections:
I. General Description
II. Computerized Implementation
I. General Description As indicted above, the present invention provides a method, system, and program product for generating an integrated view. Specifically, under the present invention, components pertaining to a particular business operation (e.g., an IT operation) of an organization are identified and then arranged into a component map by an assessment advisor tool. Information corresponding to a set of financial and staffing variables for the components is gathered and also fed into the tool. During a workshop or the like, votes regarding a differentiation/importance factor and an effectiveness factor of each of the components are received according to a predetermined scale (e.g., 1 to 5) and fed into the tool. A vote quality that is based on a standard deviation of the votes will also be determined. If the vote quality is low, the votes can be discussed during the workshop, and new votes can be taken. Once vote quality is acceptable, a series of individual heat maps that rank the components will be generated from the component map using the votes and the information previously collected. In general, an individual heat map is generated for each of the differentiation factor, the effectiveness factor, and the set of financial and staffing variables. Thereafter, an integrated heat map can be generated to answer a particular query by combining at least two of the individual heat maps. Finally, an integrated view that contains the integrated heat map and radar views of the individual heat maps will be generated.

Figure 1:
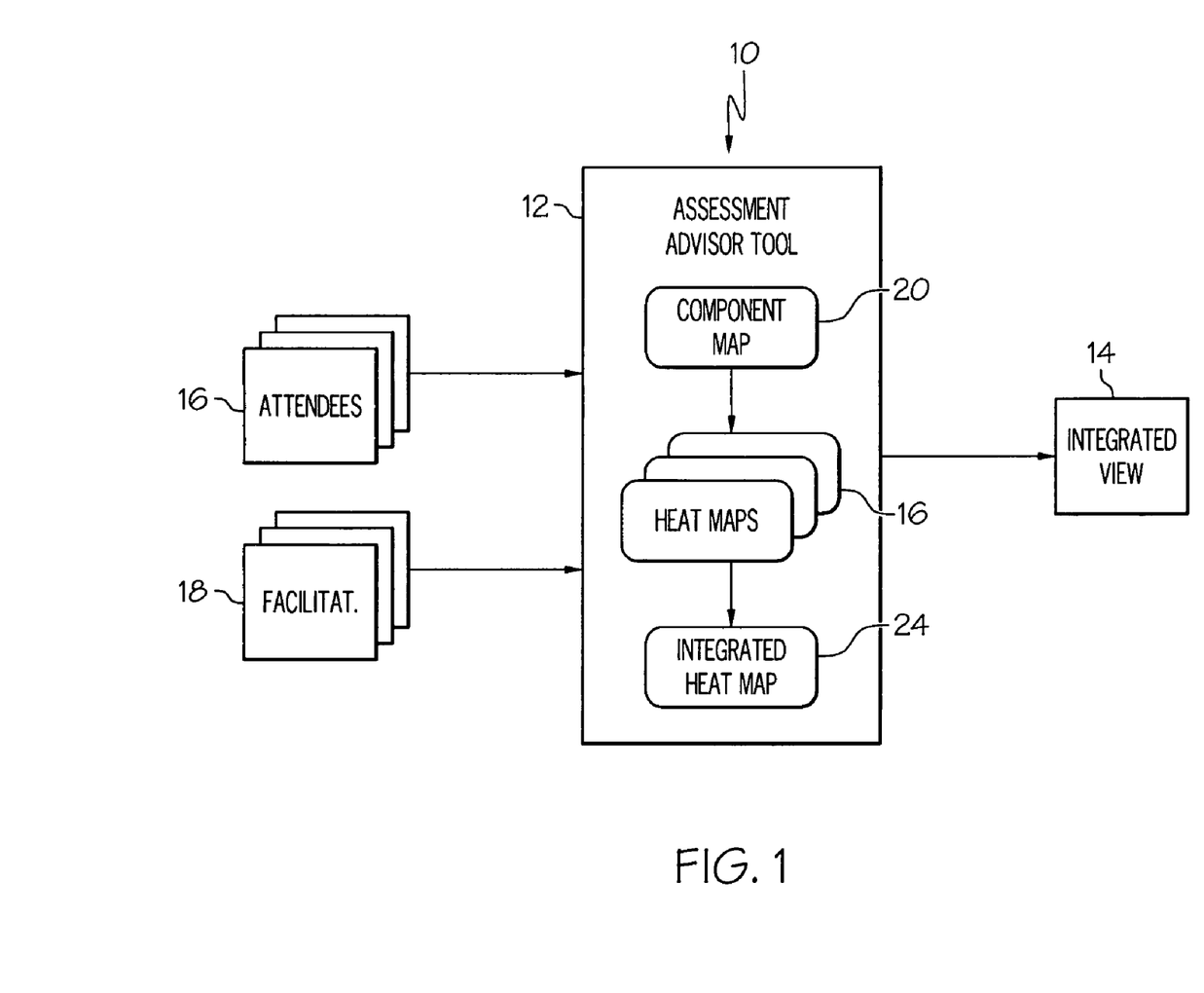
FIG. 1 shows a high level architectural diagram of the process for generating an integrated view according to the present invention.

Referring now to FIG. 1, a high level architectural diagram 10 according to the present invention is shown. Under the present invention, assessment advisor tool 12 (i.e., a software program) will generate an integrated view 14 for a business operation of an organization using various types of input. In an illustrative embodiment, assume that a workshop is being held regarding possible improvements or the like to a business operation, such as an Information Technology (IT) operation of an organization. Further, assume that the workshop involves attendees 16 (e.g., high-level executives of the organization) and facilitator(s) 18 who guide the workshop and operate assessment advisor tool 12. At an initial stage (e.g., in advance of the workshop) information about the IT operation will be gathered and fed into assessment advisor tool 12. Such information generally includes identifying the individual functions that take place within the IT operation, information corresponding to a set of financial and staffing variables for the IT operation, etc.

In a typical embodiment, the information corresponding to the financial and staffing variables include the following:

Full Time Equivalent (FTE) data: how much human resources are allocated to each component?

Spend data: how much financial resources are allocated to each component?

Effectiveness ("Eff"): how well is each component executed?

Differentiation ("DND"): how strategically important is each component?

Desired FTE allocation: how much human resources does the client wish to assign to each component;

Desired spend allocation: how much financial resources does the client with to assign to each component;

Share of FTE provided internally vs. contractors: how many of the FTE are client-owned versus contracted or outsourced? What is the desired number of contractors?

What is the relative cost of internal vs. contracted resource?

All such information is received by assessment advisor tool 12, which will then generate a component map 20. In general, the component map 20 is a graphical mapping of components where each component represents an individual function or piece (as identified) of the IT operation. Referring to FIG. 2, an illustrative component map 20 is shown. As depicted, component map 20 includes components 26 that are categorized according to various factors. Specifically, components 26 are categorized in FIG. 2 according to the stages "Plan and Manage", "Build" and "Run". Components 26 are further categorized according to role or type such as "Operation", "Tactics", and "Strategy". As indicated above, each component represents an individual function or piece of the IT operation. Examples shown include "C111-Business Enablement Service & Solution Strategy", "C211-Business Technology Strategy", etc.

Referring back to FIG. 1, once the components/objectives have been defined and the staffing and financial data is gathered and allocated, the workshop itself can take place. Soon after the session begins, attendees 16 are asked to express opinions/votes about each component for two different factors: (1) How effective is their organization at the activities and services defined by the component? (Referred to herein as an effectiveness factor); and (2) How important/differentiating is each component to the development and execution of the firm's IT strategy? Said differently, which IT components are essential—in the firm—to the company's competitiveness? (Referred to herein as a differentiation factor).

The opinions/votes are expressed according to a predetermined scale. For example, the votes can be cast on a 1 to 5 scale, where 1 is low and 5 is high. A "1" vote about effectiveness would mean that the organization performs that component poorly, if at all. A "5" vote might be considered "best of breed" or "world class." A "1" vote about differentiation would suggest a component is of basic importance, but is not differentiating at all. A "5" vote would indicate a component is a differentiator to the organization. Votes can gathered through a voting process by using automated keypads in communication with assessment advisor tool 12 or through manual techniques.

Figure 3:
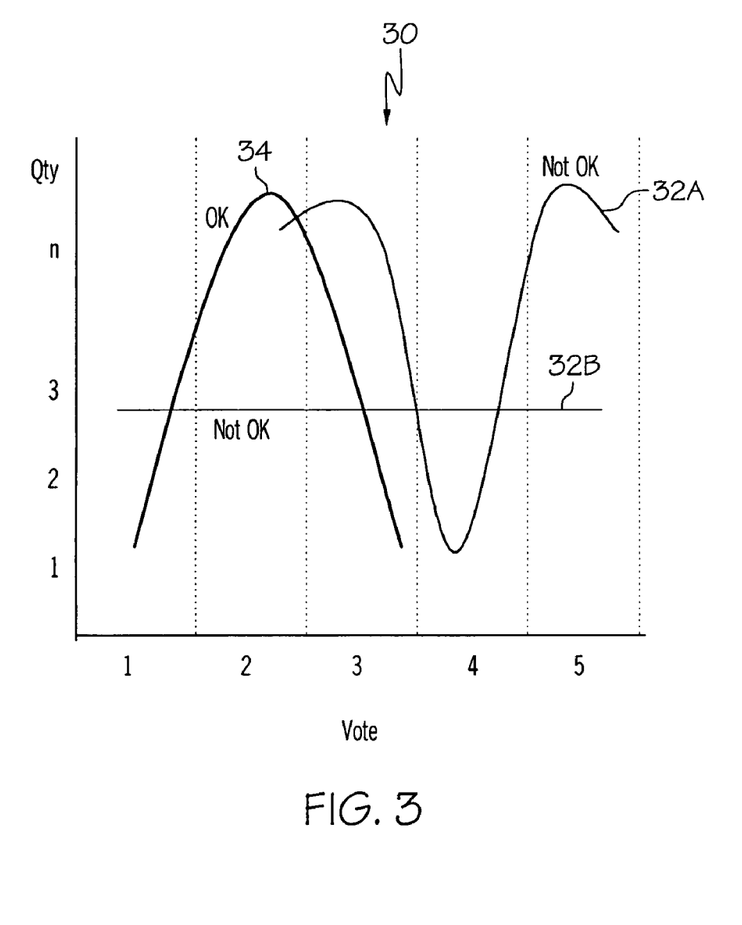
FIG. 3 shows a vote quality graph that can be generated according to the present invention.

Once complete, the next step is to identify, discuss, and potentially resolve vote quality issues. Vote quality is defined as the extent to which the votes form a meaningful pattern. For analysis purposes, vote quality is characterized by the standard deviation of the recorded votes as computed by assessment advisor tool 12. High standard deviation (>~0.92) typically indicates poor vote quality. The standard deviation of all votes is ranked in the same manner as other data. To help resolve any vote quality issues during the workshop, assessment advisor tool 12 can generate vote quality information describing different vote patterns such as those shown in FIG. 3a vote quality graph such as that shown in FIG. 3. Specifically, FIG. 3 depicts a vote quality graph 30 having examples of high/good vote quality and low/poor vote quality. Specifically, it is desirable for the votes to form a bell-shaped curve. Thus, if there are ten total votes and five votes are "1", while the other five votes are "5", the vote quality would be poor, because the standard deviation would be too high and the votes would not fit a bell-shaped curve. To this extent, curves 32A-B represent low quality votes, while curve 34 represents high quality votes.

When vote quality is low, the workshop process includes a "vote quality resolution" step. Specifically, assessment advisor tool 12 ranks all votes according to standard deviation and then provides views that highlight the components with the lowest "quality" results as described in the above paragraph. The facilitator(s) 18 (FIG. 1) show these results to the attendees 16 (FIG. 1) in descending sequence (lowest quality, i.e., highest standard deviation first) and invites the attendees 18 to explain their opinions. After this discussion, attendees 18 are invited to change their votes based on what they may have just learned. These vote changes are entered into assessment advisor tool 12. The intent of this process is to improve the vote pattern so that meaningful prioritization can occur.

Figure 4:
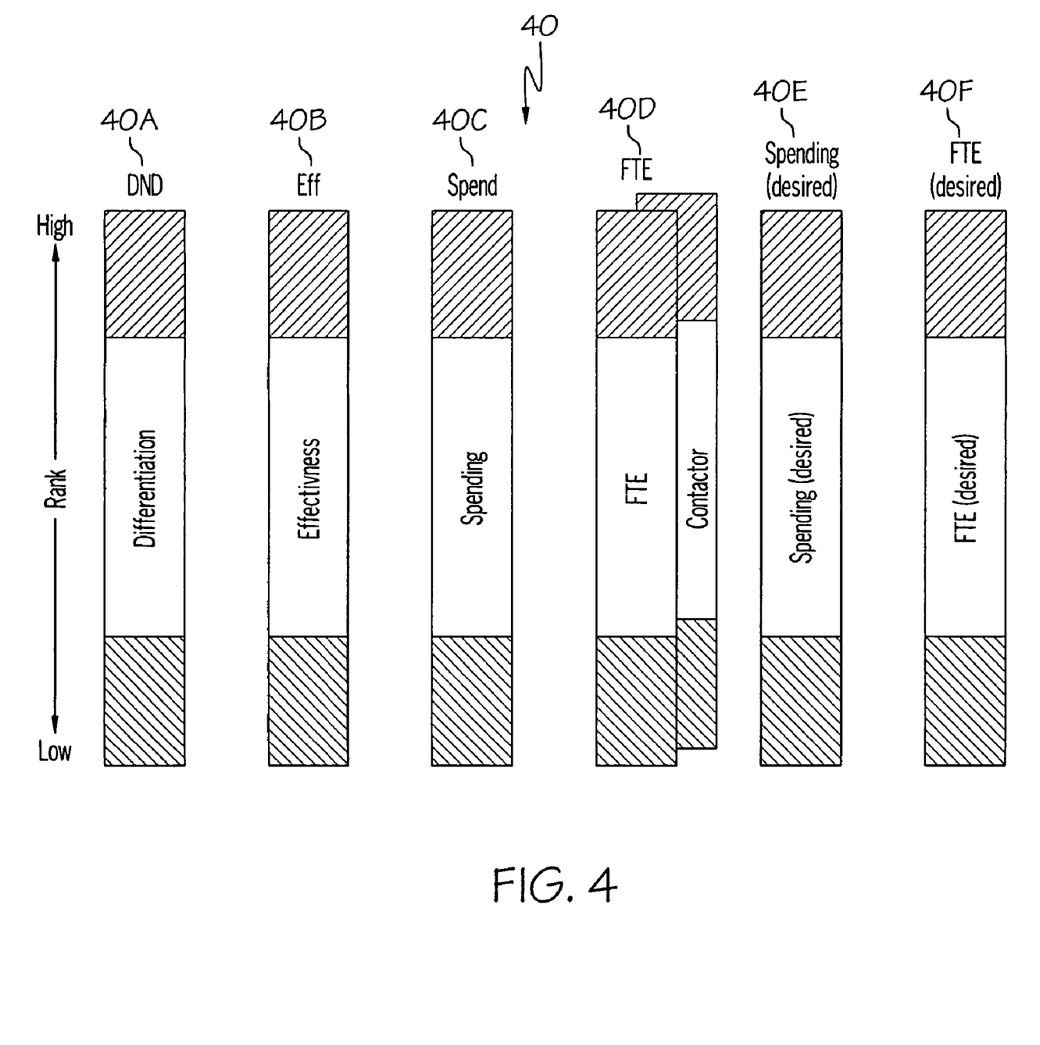
FIG. 4 shows differentiation and effectiveness factors and a set of financial and staffing variables according to the present invention.

Once the votes are satisfactory, assessment advisor tool 12 will rank the components 26 (FIG. 2) for each of the differentiation factor, the effectiveness factor, and the set of financial and staffing variables based on the votes and the collected information). Thus, if there were 50 components, they would be ranked for each of these factors/variables from 1 to 50. Referring to FIG. 4, factor/variables 40A-F for which components 26 (FIG. 2) are ranked are shown. As depicted, components 26 are ranked according to differentiation factor 40A, effectiveness factor 40B, spending variable 40C, FTE variable 40D, desired depending variable 40E and desired FTE variable 40F. For example, if a particular component was voted as a big difference maker to the organization, but was not costly and did not require a lot of manpower to implement (according to the financial and staffing variable information collected), it would be ranked highly for differentiation factor 40A, but low for spending variable 40E and FTE variable 40F.

Referring back to FIG. 1, once components 26 (FIG. 2) have been ranked in this manner, assessment advisor tool 20 will generate individual heat maps 22 that graphically depict the rankings. In general, a separate heat map 22 is generated for each factor and variables 40A-F (FIG. 4). Thus, each individual heat map 22 ranks components 26 for a particular one of the differentiation factor, the effectiveness factor, and the set of staffing and financial variables. Referring to FIG. 5A, an illustrative heat map 22A for differentiation factor 40A (FIG. 4) is shown. Components 26 are ranked using any type of formatting scheme such as color, highlighting, etc. Heat maps 22 generally resemble component map 20, only components 26 are now ranked. In FIG. 5A, a component that is ranked highly (such as "C211-Business Technology Strategy (2)") will be a component that is highly important to the organization.

Referring to FIG. 5B, another illustrative heat map 22B is shown. Heat map 22B is the heat map generated for FTE variable 40D (FIG. 4). Similar to FIG. 5A, components 26 are ranked using any type of formatting technique such as colors, highlighting, etc. In general, a component ranked highly for FTE variable (such as "C511-Development Strategy (5/7.57)") will be a component that requires a high level of manpower to implement. As further shown in FIG. 5B, individual heat maps can be provided with various mechanisms 50A-C for sorting or changing the heat maps. For example, mechanism 50A will cause heat map 22B to show only the components with the highest and lowest FTE levels, while sliders 50B-C can be toggled allow components of varying FTE levels to be shown.

In any event, referring back to FIG. 1, once individual heat maps 22 have been generated, two or more can be combined to yield an integrated heat map 24. In general, individual heat maps 22 are combined to answer a query posed for the organization. A starting list of queries and associated data combinations is listed below:

| Question | Data Combinations |
| --- | --- |
| Where are there opportunities to reduce spending levels? | Identifies components that are differentiating, effective, and with high levels of spending. |
| Where are their opportunities to reduce staffing levels? | Components that are differentiating, effective, and high levels of FTE |
| Where is there a risk of inadequate skills? | Components that are differentiating and have a high percentage of contractors |
| Where should new investment be considered? | Components that are differentiating, not effective, and with low spending levels |
| Where should increased staffing be considered? | Components that are differentiating, not effective, and with low staffing levels |
| Where does performance need to be improved? | Components that are differentiating and not effective |
| Where should outsourcing alternatives be considered? | Components that are not differentiating and with high levels of spending and FTE |
| What may not need to be changed at all? | Components which are differentiating, effective, and with levels of FTE and/or Spending which are within acceptable limits |

Figure 6A:
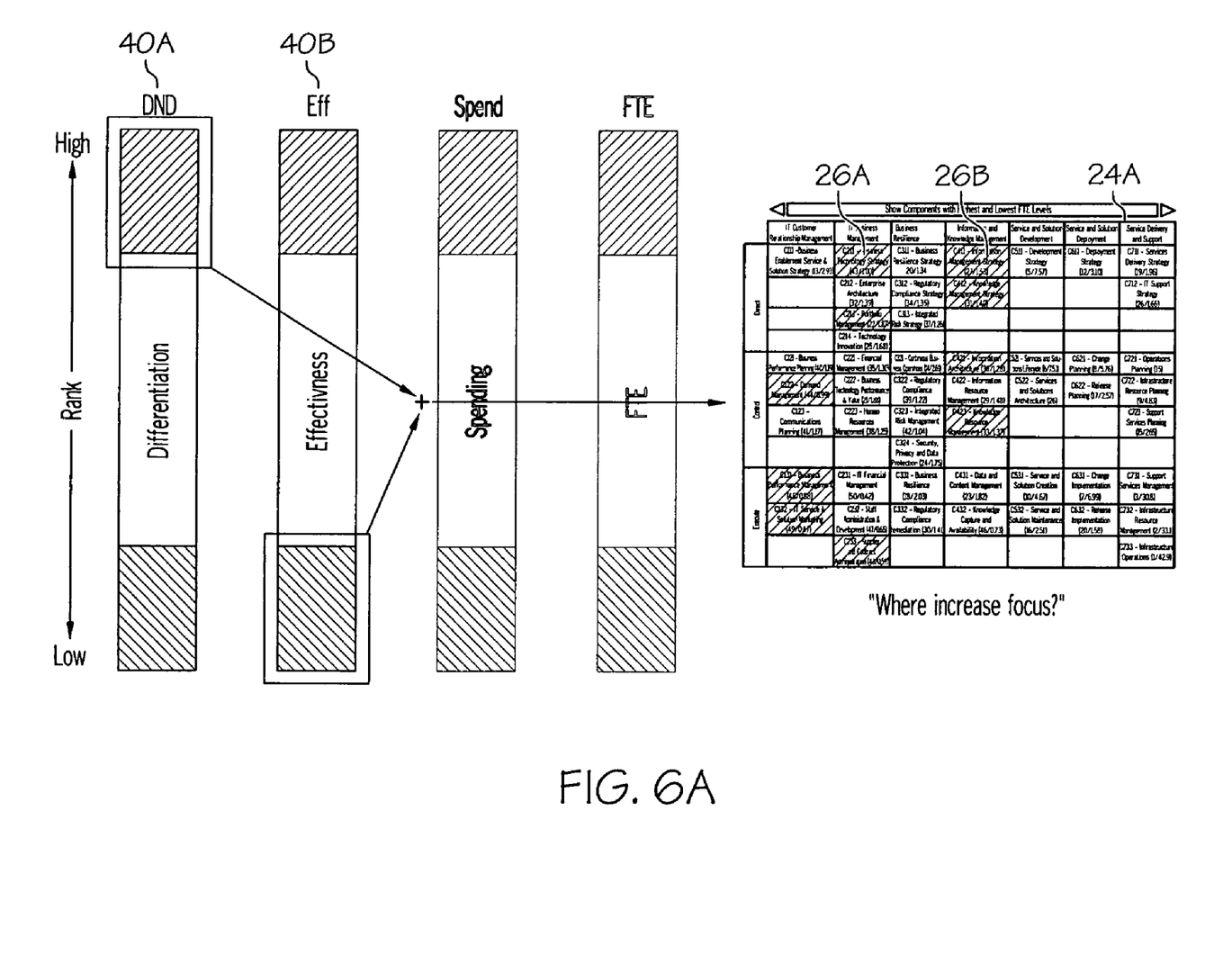
FIGS. 6A-B show illustrative integrated heat maps generated according to the present invention.

Referring to FIG. 6A, an illustrative integrated heat map 24A is shown. In general, integrated heat map 24A is generated to answer the query: where should the organization increase it focus? To answer this question, it should be determined what components are important (i.e., those having a high differentiation factor 40A), and what components are the organization not currently effective at implementing (i.e., those having a low effectiveness factor 40B). This occurs by combining the heat maps for the differentiation and effectiveness factors. Components that have a high differentiation factor and a low effectiveness factor (such as components 26A and 26B) are formatted (e.g., colored, highlighting, etc.) in integrated heat map 24A.

Figure 6B:
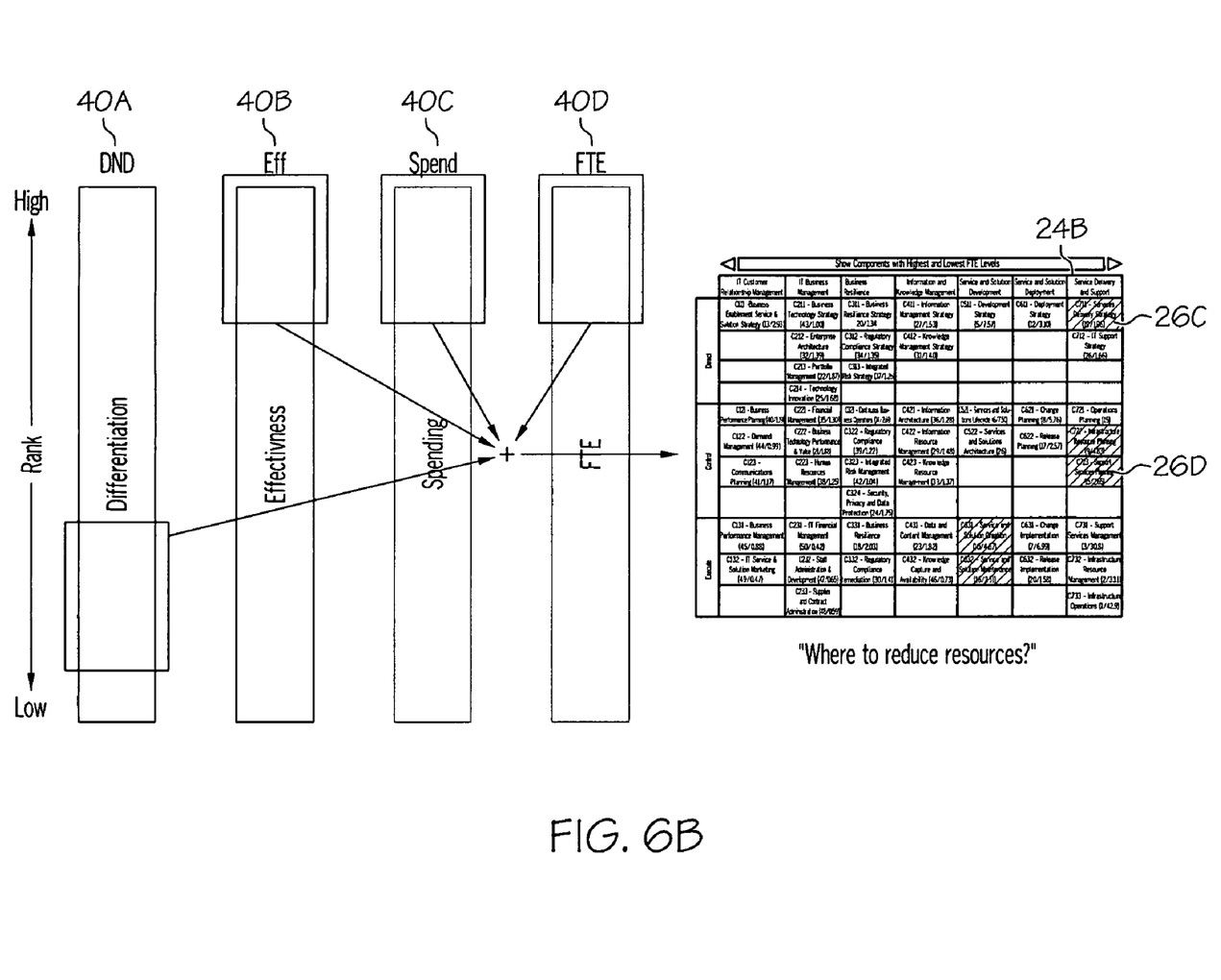

Referring to FIG. 6B, another illustrative integrated heat map 24B is shown. Heat map 24B generally addresses the query: where should resources be allocated? To answer this question it should be determined what components: are not as important (i.e., those having a low differentiation factor 40A) that the organization is effective at implementing (i.e., those having a high effectiveness factor 40B); on which the organization is spending a high level of resources (i.e., those having a high spending variable 40C); and man power (e.g., those have a high FTE variable 40D). Components fitting these criteria include components 26C-D, which are formatted (e.g., colored, highlighted, etc.) in integrated heat map 24B.

Referring back to FIG. 1, once integrated heat map 24 has been generated, assessment advisor system 12 can generate an integrated view 14. In general, the integrated view 14 will include one or more integrated heat maps 24 as well as radar views of individual heat maps 22. A radar view is typically a smaller scale representation of a heat map.

Figure 7:
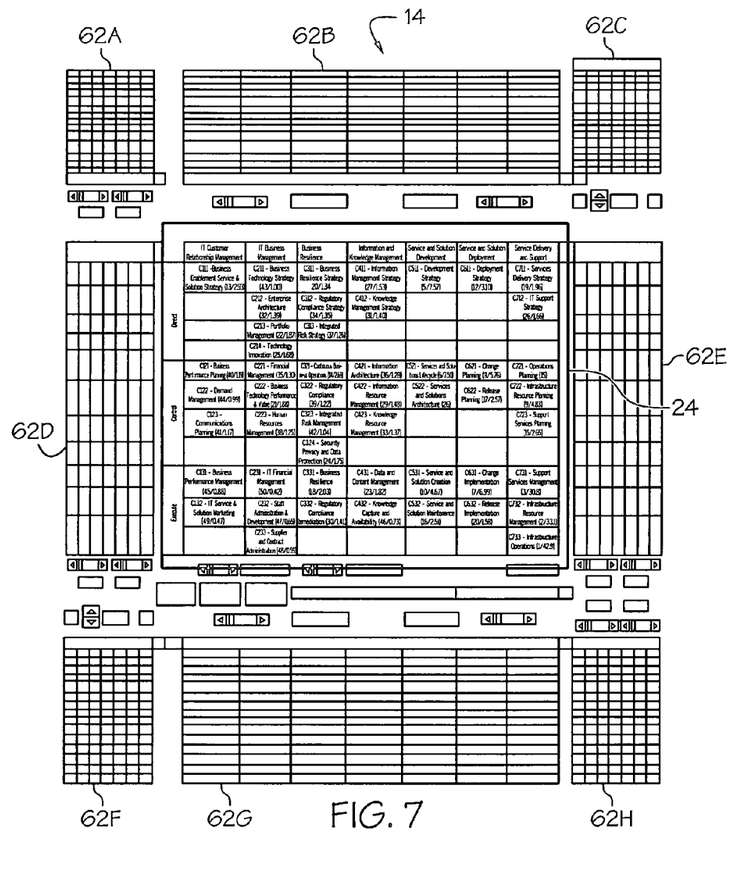
FIG. 7 shows an illustrative integrated view generated according to the present invention.

Referring to FIG. 7, an illustrative integrated view 14 is shown. As depicted, a large, integrated heat map 24 occupies the center of integrated view 14, surrounded by miniature "radar" views 62A-H, one for each type of data collected. Radar views 62A-H act as filters on the data made available to integrated heat map 24. On the center left is a radar view 62D for the effectiveness votes, while on the center right is a radar view 62E for the differentiation votes. Spending radar views 62A-B are on the center and left top of integrated view 14. That is, the spending level radar view 62A is top left and spending variance radar view 62B (the difference between today's spending and the desired or alternate spending) is top center of integrated view 14. (Variance, introduced earlier in the discussion of types of data collected and explained in more detail later, is typically only used in customized workshops or projects.) Opposite the spending views on the bottom center and right of integrated view 14 are the same radar views 62G-H for FTE. A radar view 62F for contractor FTE levels (in percentage terms) is provided in the lower left of integrated view 14. A radar view 62C for the differentiating and effectiveness vote quality is available in the upper right corner of integrated view 14.

Each of these radar views 62A-H repeats the pattern of the full size individual heat maps 22 but on a smaller scale. The effectiveness radar view 62D repeats the effectiveness heat map (called the "hi-lo" view), and so on. Each radar view 62A-H (except those for the vote quality) has two "sliders" or mechanisms to permit modification of all corresponding individual heat maps (as well as any dependent integrated heap maps) from this central integrated view 14. (The vote quality radar view 62C has one control that reveals the components based on vote quality, starting from the lowest quality votes first. The vote quality radar view 62C is used in a slightly different manner than the other radar view and will be discussed in more detail later.) One slider causes the lowest ranked components to become highlighted in rank sequence, and the other causes highest rank components to become highlighted.

In the radar views 62A-H, low and high ranked components can use different colors, either green for low (or, usually, "good") and red for high (or "bad") or, in the case of differentiation, a dark green for low and gold for high. Unlike the other heat maps 22, there is no qualitative judgment associated with high or low differentiation, hence the different color scheme. Low spending level components that are also associated with low spending or low FTE levels for that same component can turn yellow, suggesting that just because resource investment is low, that doesn't necessarily mean a positive conclusion.

The integrated heat map 24 in the center shows the results of the analysis at the moment. Components on this integrated heat map 24 will become formatted (e.g., by changing color) if they meet selection criteria established by moving the sliders for the various surrounding radar views.

Figure 8:
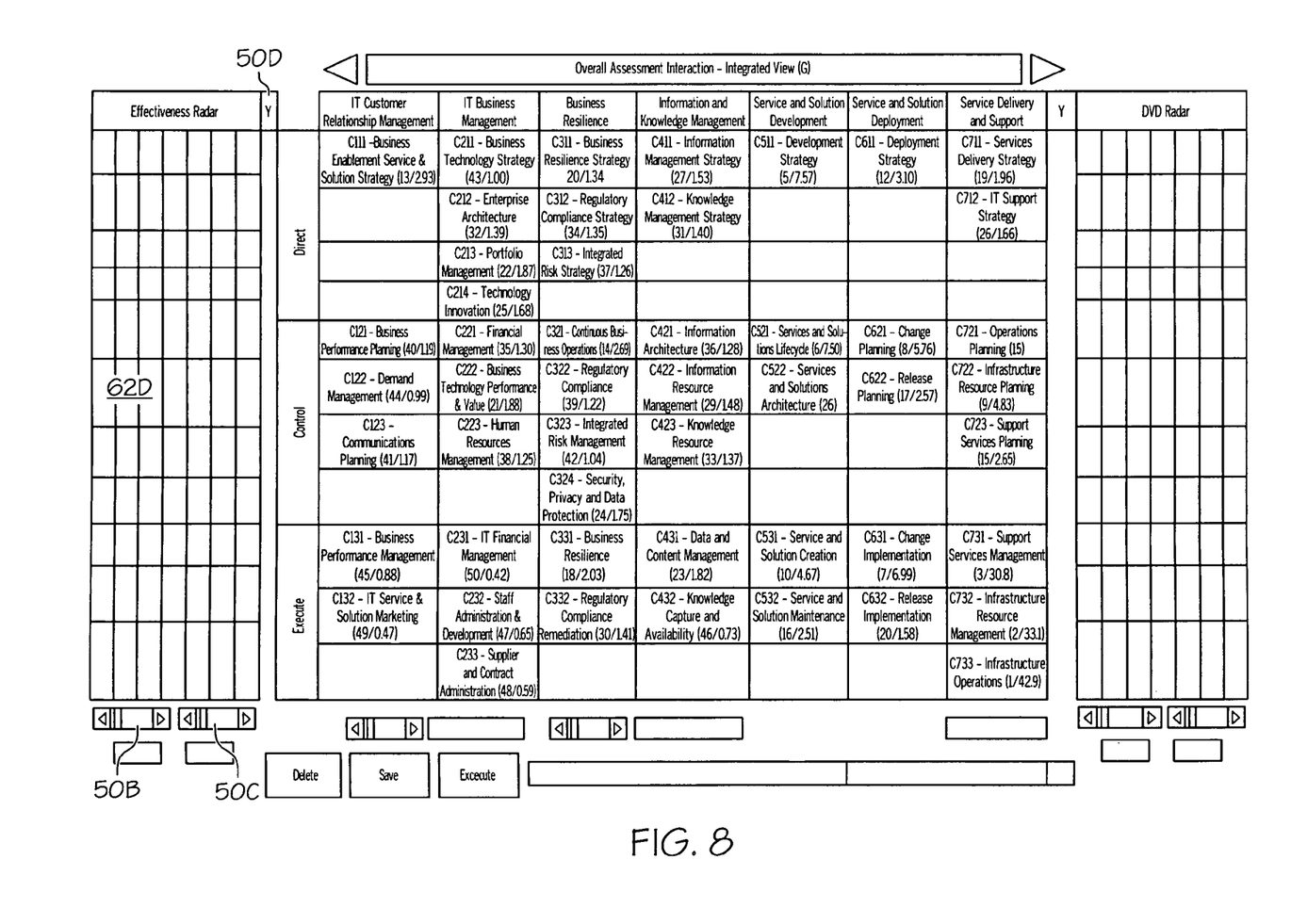
FIG. 8 shows a more focused depiction of the integrated view of FIG. 7.

Referring to FIG. 8, mechanisms 50B-D for manipulating radar views are shown in greater detail. In general, selection criteria are established by moving sliders 50B-C on one or more radar views 62D and activating their linkage 50D with the large integrated map in the center. This activation is accomplished by locating the linkage mechanism 50D (e.g., a drop-down box) next to the relevant radar view heading and toggling it from "N" to "Y." Once linked to integrated heat map 24, the combination of the selected radar views determines which components will be highlighted in the central map. Thus, if only one radar is linked to the integrated heat map 24, then the pattern of highlighted components will be the same on both the linked radar view and the integrated heat map 24. Conversely, if more than one radar view is linked to the integrated heat map 24, then only the components that are highlighted in all linked radar views will cause the corresponding component to highlight on the integrated heat map 24.

II. Computerized Implementation

Figure 9:
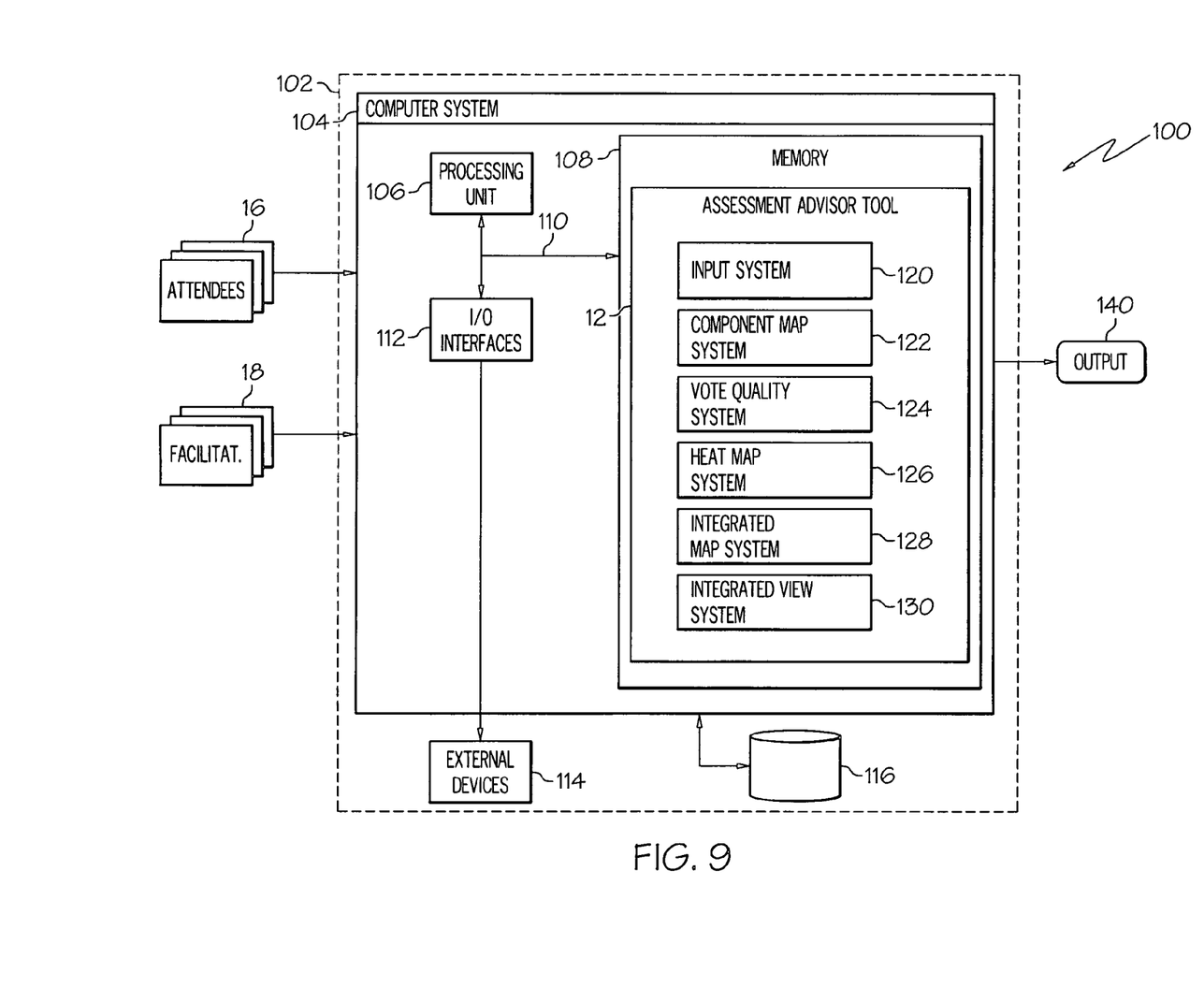
FIG. 9 shows a more specific computerized implementation according to the present invention.

Referring now to FIG. 9, a more detailed diagram of a computerized implementation 100 of the present invention is shown. As depicted, implementation 100 includes a computer system 104 deployed within a computer implementation 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer implementation 102 is intended to demonstrate that some or all of the components of implementation 100 could be deployed, managed, serviced, etc. by a service provider who offers to perform workshops and/or provide integrated views for customers/clients.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as assessment advisor tool 12, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External interfaces 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computerized implementation 102 is only illustrative of various types of computer infrastructures for implementing the invention. For example, in one embodiment, computer implementation 102 comprises two or more computing devices (e.g., a server cluster) that communicate over a network to perform the various process steps of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external interfaces 114. Still further, it is understood that one or more additional components (e.g., system software, math co-processing unit, etc.) not shown in FIG. 9 can be included in computer system 104. However, if computer system 104 comprises a handheld device or the like, it is understood that one or more external interfaces 114 (e.g., a display) and/or storage system 116 could be contained within computer system 104, not externally as shown.

Storage system 116 can be any type of system (e.g., a database) capable of providing storage for information under the present invention such as information, votes, component maps, heat maps, integrated heat maps, integrated views, etc. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is assessment advisor tool 12, which includes input system 120, component map system 122, vote quality system 124, heat map system 126, integrated map system 128, and integrated view system 130. These systems perform the functions of the present invention as discussed above. Before their functions are discussed in greater detail, it should be understood that the configuration of assessment advisor tool 12 is intended to be illustrative only and that the same functionality could be achieved with a different configuration than is shown in FIG. 9.

In any event, assume that a workshop is being conducted to address the needs of an IT operation of an organization. As indicated above, the process first begins with information collection pertaining to the IT operation. Such information helps identify the components of the operation, and typically includes information for a set of financial (e.g., spending) and staffing (e.g., FTE) variables. The collected information will be received by input system 120. Upon receipt, the information will be analyzed by component map system 122, which will identify the components and generate a component map. Thereafter, votes regarding the differentiation (e.g., importance) and effectiveness of each component will be gathered from attendees 16 and received by input system 120. Based on the votes, vote quality system 124 will determine a quality of the votes by computing their standard deviation. As part of this process, vote quality system 124 can also generate a vote quality graph to help attendees 16 and facilitator(s) 18 visualize the vote quality. If the vote quality is low/poor, the attendees 16 will discuss the votes and their rationale and re-vote. Once the vote quality is satisfactory, heat map system 126 will use the information and the votes to rank the components for each factor and variable, and generate corresponding individual heat maps. The components are typically ranked in the individual heat maps using any type of graphical formatting technique such as highlighting, coloring, etc.

Thereafter, integrated map system 128 will combine individual maps to yield integrated heat maps that answer queries for the organization (e.g., in what areas does the organization need to improve?). Once an integrated heat map has been generated, integrated view system 130 will use the same to generate an integrated view. Typically, the integrated view includes an integrated heat map as well as radar views of the individual heat maps. It should be understood that any of the material used or generated by assessment advisor tool 12 (e.g., information, votes, graphs, maps, etc.) can be provided as output 140 to attendees 16 and/or facilitator(s) 18. Output 140 can be communicated by the individual sub-systems of assessment advisor tool 12 or by a separate output sub-system (not shown). It should also be understood that any mechanisms (e.g., sliders, buttons, menus, etc.) provided for the different maps and/or graphs are typically provided by the corresponding sub-system. For example, the mechanisms on individual heat maps can be generated/provided by heat map system 126.

While shown and described herein as a method and system for generating an integrated view, it is understood that the invention further provides various alternative embodiments. For example, in one embodiment, the invention provides a computer-readable/useable medium that includes computer program code to enable a computer infrastructure to generate an integrated view. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 9) and/or storage system 116 (FIG. 9) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to generate an integrated view. In this case, the service provider can create, maintain, support, etc., a computer infrastructure, such as computer implementation 102 (FIG. 9) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for generating an integrated view. In this case, a computer infrastructure, such as computer implementation 102 (FIG. 9), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 104 (FIG. 9), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for generating an integrated view, comprising:
arranging components of a business operation into a component map;
receiving information corresponding to a set of financial and staffing variables for each of the components;
receiving votes regarding a differentiation factor and an effectiveness factor of each of the components according to a predetermined scale;
generating, via a computer device, from the component map, individual heat maps for every one of the differentiation factor, the effectiveness factor, and the set of financial and staffing variables using the votes and the information, wherein every one of the individual heat maps is a graphical mapping of components in which the components are ranked based on a specific factor or a specific variable;
generating, via the computer device, an integrated heat map by combining at least two of the individual heat maps to answer a particular query, all of the individual heat maps used to generate the integrated heat map being based on different ones of the differentiation factor, the effectiveness factor, and the set of financial and staffing variables using the votes and the information; and
generating, via the computer device, the integrated view containing the integrated heat map and radar views of the individual heat maps.

2. The method of claim 1, further comprising:
determining a standard deviation of the votes to determine a quality of the votes, prior to generating the individual heat maps;
ranking the votes according to the standard deviation;
generating a vote quality view that depicts the quality of the votes; and
receiving revised votes for votes having a low quality, wherein the revised votes are used to generate the individual heat maps.

3. The method of claim 1, wherein each of the individual heat maps ranks the components for a particular one of the differentiation factor, the effectiveness factor, and the set of staffing and financial variables, and wherein the components are ranked in the individual heat maps for the differentiation factor and the effectiveness factor using the votes.

4. The method of claim 3, wherein the components are ranked in the individual heat maps using color.

5. The method of claim 1, wherein the radar views comprise smaller scale representations of the individual heat maps.

6. The method of claim 1, wherein the business operation comprises an Information technology (IT) operation of an organization, and wherein the components each represent a specific part of the business operation.

7. The method of claim 1, wherein the components of the integrated heat map are formatted based on which of the components best answer the particular query.

8. The method of claim 1, wherein the integrated view comprises a set of user interface controls associated with each of the radar views for changing the integrated heat map based upon the associated radar views.

9. A system for generating an integrated view, comprising:
at least one computer device, having:
a system for arranging components of a business operation into a component map;
a system for receiving information corresponding to a set of financial and staffing variables for each of the components;

a system for receiving votes regarding a differentiation factor and an effectiveness factor of each of the components according to a predetermined scale;

a system for generating, from the component map, individual heat maps for every one of the differentiation factor, the effectiveness factor, and the set of financial and staffing variables using the votes and the information, wherein each of the individual heat maps is a graphical mapping of components in which the components are ranked based on a specific factor or a specific variable;

a system for generating an integrated heat map by combining at least two of the individual heat maps to answer a particular query, all of the individual heat maps used to generate the integrated heat map being based on different ones of the differentiation factor, the effectiveness factor, and the set of financial and staffing variables using the votes and the information; and a system for generating the integrated view containing the integrated heat map and radar views of the individual heat maps.

10. The system of claim 9, further comprising:

a system for determining a standard deviation of the votes to determine a quality of the votes, prior to generating the individual heat maps;

a system for ranking the votes according to the standard deviation;

a system for generating a vote quality view that depicts the quality of the votes; and a system for receiving revised votes for votes having a low quality, wherein the revised votes are used to generate the individual heat maps.

11. The system of claim 9, wherein each of the individual heat maps ranks the components for a particular one of the differentiation factor, the effectiveness factor, and the set of staffing and financial variables.

12. The system of claim 10, wherein the components are ranked in the individual heat maps using color.

13. The system of claim 9, wherein the radar views comprise smaller scale representations of the individual heat maps.

14. The system of claim 9, wherein the business operation comprises an Information technology (IT) operation of an organization, and wherein the components each represent a specific part of the business operation.

15. The system of claim 9, wherein the components of the integrated heat map are formatted based on which of the components best answer the particular query.

16. The system of claim 9, wherein the integrated view comprises a set of user interface controls associated with each of the radar views for changing the integrated heat map based upon the associated radar views.

17. The system of claim 16, wherein the set of user interface controls comprise controls for establishing selection criteria for the radar views, and controls for linking the radar view to the integrated heat map.

18. A program product stored on a computer readable storage medium for generating an integrated view, the computer readable medium comprising program code that upon execution, causes a computer system to perform the following steps:

arranging components of a business operation into a component map;

receiving information corresponding to a set of financial and staffing variables for each of the components;

receiving votes regarding a differentiation factor and an effectiveness factor of each of the components according to a predetermined scale;

generating, from the component map, individual heat maps for every one of the differentiation factor, the effectiveness factor, and the set of financial and staffing variables using the votes and the information, wherein each of the individual heat maps is a graphical mapping of components in which the components are ranked based on a specific factor or a specific variable;

generating an integrated heat map by combining at least two of the individual heat maps to answer a particular query, all of the individual heat maps used to generate the integrated heat map being based on different ones of the differentiation factor, the effectiveness factor, and the set of financial and staffing variables using the votes and the information; and generating the integrated view containing the integrated heat map and radar views of the individual heat maps.

19. The program product of claim 18, wherein the computer readable storage medium further comprises program code for causing the computer system to perform the following steps:

determining a standard deviation of the votes to determine a quality of the votes, prior to generating the individual heat maps;

ranking the votes according to the standard deviation;

generating a vote quality view that depicts the quality of the votes; and receiving revised votes for votes having a low quality, wherein the revised votes are used to generate the individual heat maps.

20. The program product of claim 18, wherein each of the individual heat maps ranks the components for a particular one of the differentiation factor, the effectiveness factor, and the set of staffing and financial variables.

21. The program product of claim 20, wherein the components are ranked in the individual heat maps using color.

22. The program product of claim 18, wherein the radar views comprise smaller scale representations of the individual heat maps.

23. The program product of claim 18, wherein the business operation comprises an Information technology (IT) operation of an organization, and wherein the components each represent a specific part of the business operation.

24. The program product of claim 18, wherein the components of the integrated heat map are formatted based on which of the components best answer the particular query.

25. The program product of claim 18, wherein the integrated view comprises a set of user interface controls associated with each of the radar views for changing the integrated heat map based upon the associated radar views.

26. A method for deploying an application for generating an integrated view, comprising:

providing a computer infrastructure having at least one computer device being operable to:

arrange components of a business operation into a component map;

receive information corresponding to a set of financial and staffing variables for the components;

receive votes regarding a differentiation factor and an effectiveness factor of each of the components according to a predetermined scale;

generate, from the component map, individual heat maps for every one of the differentiation factor, the effectiveness factor, and the set of financial and staffing variables using the votes and the information, wherein each of the individual heat maps is a graphical mapping of components in which the components are ranked based on a specific factor or a specific variable;

generate an integrated heat map by combining at least two of the individual heat maps to answer a particular query, all of the individual heat maps used to generate the integrated heat map being based on different ones of the differentiation factor, the effectiveness factor, and the set of financial and staffing variables using the votes and the information; and generate the integrated view containing the integrated heat map and radar views of the individual heat maps.

27. A computer device having an integrated view, comprising:

an integrated heat map generated by combining at least two of a plurality of individual heat maps, wherein each of the plurality of individual heat maps contains components of a business operation that are ranked, and wherein the components are highlighted in the integrated heat map based upon which of the components best answer a query for the business operation, wherein every one of the individual heat maps is a graphical mapping of components in which the components are ranked based on a specific factor or a specific variable, all of the individual heat maps used to generate the integrated heat map being based on different ones of the differentiation factor, the effectiveness factor, and the set of financial and staffing variables using the votes and the information; and a plurality of radar views adjacent to the integrated heat map, wherein the plurality of radar views are smaller scale representations of the plurality of individual heat maps.

28. The computer device of claim 27, wherein the components are ranked in each of the plurality of individual heat maps according to a particular one of a differentiation factor, an effectiveness factor, and a set of staffing and financial variables, and wherein the components are ranked in the individual heat maps for the differentiation factor and the effectiveness factor using votes.

29. The computer device of claim 27, further comprising user interface controls associated with each of the radar views for changing the integrated heat map based upon the associated radar views.

30. The computer device of claim 29, wherein the user interface controls comprise controls for individually linking the radar views to the integrated view.

* * * * *